(12) United States Patent
Ballu

(10) Patent No.: US 10,004,171 B2
(45) Date of Patent: Jun. 26, 2018

(54) ASSEMBLY COMPRISING A CHASSIS FOR A VARIABLE-TRACK MACHINERY EQUIPMENT SUCH AS A SPRAYER-TYPE AGRICULTURAL MACHINERY EQUIPMENT OR A STRADDLE MACHINERY EQUIPMENT

(71) Applicant: EXEL INDUSTRIES, Paris (FR)

(72) Inventor: Cyril Ballu, Saint Jean le Blanc (FR)

(73) Assignee: EXEL INDUSTRIES, Paris (FR)

( * ) Notice: Subject to any disclaimer, the term of this patent is extended or adjusted under 35 U.S.C. 154(b) by 0 days. days.

(21) Appl. No.: 15/023,647

(22) PCT Filed: Sep. 19, 2014

(86) PCT No.: PCT/FR2014/052335
§ 371 (c)(1),
(2) Date: Mar. 21, 2016

(87) PCT Pub. No.: WO2015/040337
PCT Pub. Date: Mar. 26, 2015

(65) Prior Publication Data
US 2016/0227698 A1 Aug. 11, 2016

(30) Foreign Application Priority Data
Sep. 20, 2013 (FR) ...................................... 13 59082

(51) Int. Cl.
*A01B 63/00* (2006.01)
*B62D 7/15* (2006.01)
(Continued)

(52) U.S. Cl.
CPC .......... *A01B 63/006* (2013.01); *B60B 35/109* (2013.01); *B60B 35/1045* (2013.01);
(Continued)

(58) Field of Classification Search
CPC ........ A01B 63/006; B62D 7/18; B62D 7/166; B62D 7/1572; B62D 7/1581; B62D 7/142;
(Continued)

(56) References Cited

U.S. PATENT DOCUMENTS 2,824,749 A * 2/1958 Yasuda ................ B62D 7/1527
180/409
3,174,769 A * 3/1965 De Voghel ............... B62D 7/02
180/409

(Continued)

FOREIGN PATENT DOCUMENTS

WO 2005068278 A1 7/2005

OTHER PUBLICATIONS

International Search Report dated Jan. 19, 2015 re: Application No. PCT/FR2014/052335; pp. 1-2; WO 2005/068278 A1, US 4 263 979 A, US 2004/129491 A1.

*Primary Examiner* — Darlene P Condra
(74) *Attorney, Agent, or Firm* — Cantor Colburn LLP

(57) ABSTRACT

The present invention relates to an assembly which includes: a chassis for a mobile land vehicle, in particular an agricultural or public works vehicle; at least two half-crossmembers (21) mounted telescopically on the chassis; wheel mountings (27) pivotably mounted on each one of said half-crossmembers; steered wheels rotatably mounted on said mountings; and a device for controlling the direction of the wheels. The assembly is characterized in that it includes means (39, 41, 47) designed, for a certain position of two half-crossmembers, to increase, upon the pivoting of the wheels, the opening of the said wheels relative to the opening of the wheels resulting from the same pivoting and another position of the two half-crossmembers.

16 Claims, 8 Drawing Sheets

(51) Int. Cl.
  *B60B 35/10* (2006.01)
  *B62D 7/14* (2006.01)
  *B62D 7/16* (2006.01)
  *B62D 7/18* (2006.01)

(52) U.S. Cl.
  CPC .......... *B60B 35/1054* (2013.01); *B62D 7/142* (2013.01); *B62D 7/1509* (2013.01); *B62D 7/1527* (2013.01); *B62D 7/1554* (2013.01); *B62D 7/1572* (2013.01); *B62D 7/1581* (2013.01); *B62D 7/166* (2013.01); *B62D 7/18* (2013.01); *B60B 35/1036* (2013.01)

(58) Field of Classification Search
  CPC .. B62D 7/1527; B62D 7/1554; B62D 7/1509; B60B 35/1045; B60B 35/109; B60B 35/1054; B60B 35/1036
  See application file for complete search history.

(56) References Cited

U.S. PATENT DOCUMENTS

| | | | | |
|---|---|---|---|---|
| 4,109,747 | A * | 8/1978 | Hornagold | B60B 35/003 180/403 |
| 4,263,979 | A | 4/1981 | Sturgill | |
| 7,780,197 | B2 * | 8/2010 | White | B60G 9/02 280/781 |
| 2004/0129491 | A1 | 7/2004 | Bean et al. | |
| 2006/0054366 | A1 * | 3/2006 | Priepke | B62D 7/142 180/6.24 |
| 2010/0075727 | A1 * | 3/2010 | Coers | A01D 41/12 460/150 |
| 2010/0283218 | A1 * | 11/2010 | Coers | B60B 35/1054 280/269 |
| 2011/0001299 | A1 * | 1/2011 | Wagemann | B60G 9/025 280/124.112 |
| 2011/0133416 | A1 * | 6/2011 | Hiddema | A01C 23/008 280/5.508 |
| 2011/0266774 | A1 * | 11/2011 | Gregg | B62D 13/00 280/419 |
| 2012/0025477 | A1 * | 2/2012 | Mackin | B60B 35/1054 280/5.522 |
| 2013/0062133 | A1 * | 3/2013 | Budweil | B60B 35/1063 180/209 |
| 2015/0137471 | A1 * | 5/2015 | Smith | B62D 7/16 280/93.502 |
| 2015/0321695 | A1 * | 11/2015 | Welin | B62D 7/144 280/91.1 |
| 2016/0009135 | A1 * | 1/2016 | Jong | B60B 35/10 280/5.52 |
| 2016/0144891 | A1 * | 5/2016 | Reubens | B62D 7/18 280/93.512 |
| 2016/0318549 | A1 * | 11/2016 | Cook | B62D 7/08 |
| 2016/0339954 | A1 * | 11/2016 | Makisalo | B62D 7/18 |
| 2017/0210192 | A1 * | 7/2017 | Reybrouck | B60G 17/0165 |

* cited by examiner

ASSEMBLY COMPRISING A CHASSIS FOR A VARIABLE-TRACK MACHINERY EQUIPMENT SUCH AS A SPRAYER-TYPE AGRICULTURAL MACHINERY EQUIPMENT OR A STRADDLE MACHINERY EQUIPMENT

TECHNICAL FIELD

The present invention relates to an assembly comprising a chassis for a movable terrestrial variable-track machinery equipment such as a sprayer-type agricultural machinery equipment or a straddle machinery equipment.

BACKGROUND

In the present description, by «movable terrestrial machinery equipment», it is referred to any self-propelled or trailed machinery equipment moving on the ground. In turn, the expression «variable-track» refers to any machinery equipment equipped with a device adapted for modifying the distance between two wheels of the same axle.

Conventionally, such a machinery equipment comprises a chassis resting on a front axle and on a rear axle, each axle receiving at its ends a knuckle on which the hub of a wheel is engaged. An axle may consist only of a carrier axle or it may be a drive axle.

In general, the displacement of a vehicle is achieved by the rotation of at least one axle, driven in rotation directly or indirectly by an output shaft of a motor, for example a heat engine or an electric motor. In turn, the direction of displacement is controlled by a steering control device acting on the front and/or rear wheels.

In the case where the front wheels are steerable, each front wheel is secured to a steering knuckle assembly which is, in turn, secured to a steering tie rod movable in rotation about a substantially vertical axis.

The rotation of the steering tie rods is controlled from the driver's cab by the driver who acts on a steering wheel.

A steering control device known in the prior art comprises a steering wheel secured to a steering column at the end of which is mounted a pinion meshing with a rack, secured, at each one of its ends, to the steering tie rods.

There is also known a steering control device according to which the steering tie rods are, on the one hand, secured to a steering knuckle assembly supporting the wheel, and on the other hand, pivotally mounted at their free end on a rod of a hydraulic or pneumatic double-acting cylinder, the displacement of the rod of the cylinder being ensured by the introduction of a fluid or a gas at either side of the piston.

The introduction of the fluid into the cylinder is controlled from the driver's cab by the rotation of the steering wheel, engaged with a hydraulic pump and with a system of appropriate valves known by those skilled in the art.

However, regardless of the retained embodiment of the steering control device, during a turn, the steered wheels of the vehicle do not cover the same distance. Hence, it is necessary that, during a turn, the steered wheels do not remain parallel to each other. For this purpose, it is necessary to provide for distinct angles of rotation for the right front wheel and for the left front wheel, in the case where the steered wheels of the vehicle are the front wheels.

If this condition is not met, a wheels shifting phenomenon happens, which phenomenon should be avoided, on the one hand, in order not to undermine the safety of the persons on-board (the shifting results in an excessive slipping of the wheels on the ground) and, on the other hand, in order to prevent an excessive and premature wearing of the tires.

In order to avoid this phenomenon, the sizing of the different members constituting the steering control device is typically carried out based on the Ackermann steering geometry, well known by those skilled in the art.

FIG. 1 schematically represents a machinery equipment 1 comprising a front axle 2 at the ends of which are mounted two steerable front wheels $3_G$, $3_D$, and a rear axle 5 at the ends of which are mounted two rear wheels $7_G$, $7_D$.

FIG. 2 illustrates the Ackermann steering geometry applied to the represented machinery equipment 1, in a cornering situation.

The non-slip condition is met when, during a turn, the lines of contact with the ground of the four wheels are tangent to the circle defined by the turn.

In other words, the non-slip condition is met when the four wheels have a common center of rotation (commonly called «ICR», standing for «Instantaneous Center of Rotation»), corresponding to a sufficient opening angle α between the wheels. If the front wheels are the only steerable wheels, the common center of rotation is then necessarily located on the axis of the rear axle.

Thus, as is represented, for a right turn, the Ackermann steering geometry assesses that the non-slip condition is met if the line $(d_D)$ perpendicular to the line of contact of the right front wheel $3_D$ with the ground and the line $(d_G)$ perpendicular to the line of contact of the left front wheel $3_G$ with the ground intersect on the line $(d_5)$, which lines links the two points of contact of the rear wheels $7_G$ and $7_D$ with the ground. The point of intersection of these two lines is also called the Ackermann point.

Non-slipping in turns is achieved thanks to a specific sizing of the steering tie rods $9_G$, $9_D$ and a control arm 11, schematically represented in FIG. 2 for a better understanding of the system. For this purpose, as illustrated in FIG. 3, the Ackermann principle requires the steering tie rods $9_G$, $9_D$ to be positioned so that their longitudinal axes $(d_{9G})$, $(d_{9D})$ intersect in the vertical plane passing through the axis $(d_5)$ of the rear axle 5, at the middle of the axle, when the vehicle is in a rectilinear displacement.

Some vehicles, such as, for example, sprayer-type agricultural machinery equipment's or straddle machinery equipment's are so-called «variable-track» vehicles, that is to say that the distance between two wheels of the same axle is variable between an enlarged position, allowing for example for a better stability on land when the vehicle is used for land treatment purposes for example, and a retracted position, allowing in particular the vehicle to adapt to the widths of all tracks of the roadway.

In a known manner, switching between the positions is generally carried out when the vehicle is on the land parcel to be treated. For this purpose, the vehicle is generally fitted with a hydraulic device adapted for activating at least one cylinder the attachment point of which is secured to the chassis of the machinery equipment, and the end of the movable rod of which is secured to a telescopic axle or directly to the wheel.

FIG. 4 illustrates the Ackermann steering geometry applied to the machinery equipment 1 in the enlarged position, in a cornering situation.

For an inclination of the front wheels $3_G$, $3_D$ identical to that illustrated in FIG. 2 when the machinery equipment is in the retracted position, the left front wheel $3_G$ and the right front wheel $3_D$ have each a center of rotation $ICR_{3G}$, $ICR_{3D}$ distinct from each other if the lines $(d_D)$ and $(d_G)$ intersect with the axis $(d_5)$ of the rear axle 5.

This results in a shifting phenomenon the drawbacks of which have been described before.

The Ackermann steering geometry applied to a four-wheel-steered machinery equipment, in a cornering situation, is now represented in FIG. 5.

A four-wheel-steered machinery equipment allows for a larger steering angle in comparison with a two-wheel-steered machinery equipment. This arrangement is particularly advantageous for agricultural machinery equipment's when performing relatively tight turns, for example on headlands.

In a cornering situation, pivoting of the left rear wheel $7_G$, respectively of the right rear wheel $7_D$, corresponds to the symmetric of the position of the left front wheel $3_G$, respectively of the right front wheel $3_D$, with respect to the midplane of the front and rear axles.

As before, the non-slip condition is met if, during a turn, the lines of contact of the four wheels with the ground are tangent to the circle defined by the turn. In other words, the non-slip condition is met if the four wheels have a common center of rotation (ICR), corresponding to a sufficient opening angle $\alpha_{AV}$ and $\alpha_{AR}$ between the wheels.

Typically, if the front and rear wheels are all steerable, the opening angle $\alpha_{AV}$ between the right and left front wheels, and the angle $\alpha_{AR}$ between the right and left rear wheels, are sufficient if each of these angles is substantially equal to half the opening angle $\alpha$ obtained if the machinery equipment comprises only but two steerable wheels.

If the front wheels and the rear wheels are all steerable, the common center of rotation is located in the transverse midplane 10 of the machinery equipment.

By «transverse midplane», it is referred to the plane perpendicular to the middle axis of the machinery equipment, that is to say perpendicular to the axis symbolizing the direction of displacement of the machinery equipment in a rectilinear displacement, and substantially equidistant from the front axle 2 and from the rear axle 5.

Thus, as is represented, for a right turn, the Ackermann steering geometry assesses that the non-slip condition is met if the lines perpendicular to the lines of contact of the four steered wheels with the ground intersect with the line of intersection between the ground and the transverse midplane 10 of the chassis.

As before, in the case of a variable-track vehicle such as, for example, a sprayer-type agricultural machinery equipment or a straddle machinery equipment, the distance between two wheels of the same axle is variable between an enlarged position and a retracted position.

FIG. 6 illustrates the Ackermann steering geometry applied to the four-wheel-steered machinery equipment, in the enlarged position and in a cornering situation.

For a pivoting of the wheels $3_G$, $3_D$, $7_G$, $7_D$, identical to that illustrated in FIG. 5 when the machinery equipment is in the retracted position, each steered wheel possesses its own instantaneous center of rotation, distinct from the transverse midplane 10, which results in a shifting phenomenon, in the same manner as for a two-wheel-steered machinery equipment, with the generation of the aforementioned drawbacks.

BRIEF SUMMARY

The present invention aims to overcome the aforementioned drawbacks, and to this end, it relates to an assembly comprising:

a chassis for a movable terrestrial machinery equipment, in particular an agricultural or a construction machinery equipment;

at least two half-crossmembers telescopically mounted on the chassis between a retracted position and an extended position;

wheels supports pivotally mounted on each one of said half-crossmembers;

steerable wheels rotatably mounted on said supports and connected to each other by an axle;

a device for piloting the steering of the wheels;

said assembly being remarkable in that it comprises mechanical or electro-hydraulic or electro-electric means shaped so as to enlarge or reduce the angle between the wheels of the same axle for a certain pivoting of said wheels and for a certain position of said half-crossmembers, in comparison with the angle obtained between said wheels, for the same pivoting of said wheels and for another position of said half-crossmembers, said enlargement or reduction being directly dependent of the distance between the wheels.

Thus, by providing means shaped so as to enlarge or reduce the relative opening of the wheels when they pivot, for a certain position of the two half-crossmembers, in comparison with the relative opening of the wheels obtained for the same pivoting and with another position of the two half-crossmembers, the instantaneous center of rotation is displaced, when the wheels pivot, toward the line linking the two points of contact of the rear wheels with the ground when the vehicle has two steerable wheels. For a four-wheel-steered vehicle, the instantaneous center of rotation of the four wheels is substantially aligned on the transverse midplane of the chassis.

By displacing the instantaneous center of rotation in this manner, we closely approach the Ackermann steering geometry regardless of the retained track width of the machinery equipment, thereby allowing meeting as best as possible the non-slip condition, and avoiding wheels shifting situations.

According to a first embodiment of the invention, the device for piloting the steering of the wheels comprises steering cylinders interposed between the chassis and the wheels supports and, according to the invention, said means shaped so as to enlarge or reduce the angle between the wheels of the same axle for a certain pivoting of said wheels and for a certain position of said half-crossmembers, in comparison with the angle obtained between said wheels, for the same pivoting of said wheels, and for another position of said half-crossmembers, said enlargement or reduction being directly dependent of the distance between the wheels, comprise mechanical means for displacing the attachment point of each steering cylinder during an extension of the half-crossmembers relative to the chassis.

Thus, by providing mechanical means for displacing the attachment point of each steering cylinder, shaped so as to enlarge or reduce the relative opening of the wheels when they pivot, for a given position of the two half-crossmembers, in comparison with the relative opening of the wheels obtained when they pivot, for another position of the two half-crossmembers, the displacement of the attachment point of each cylinder is achieved concurrently with the modification of the track width of the machinery equipment, thereby allowing reducing the time for switching from a track width into another, while ensuring the proper positioning of the cylinder over the entire track width.

According to other optional features, specific to the first embodiment of the assembly according to the invention:

the attachment point of each cylinder cooperates with at least one ramp/glider system shaped so as to constrain the attachment point of each cylinder to be displaced in a glider;

the means for displacing the attachment point of each cylinder comprise, on the one hand, at least one sub-mount mounted on a half-crossmember and comprising said glider shaped so as to cooperate with the attachment point of each cylinder, and on the other hand, at least one ramp mounted on a crossmember support secured to the chassis, said ramp being shaped so as to constrain the displacement of the attachment point of the cylinder in said glider during a displacement of said half-crossmembers. By providing for mounting a sub-mount on a half-crossmember and a ramp on the crossmember support in order to realize the means for displacing the attachment point of each cylinder, the device is simple to mount and may be adapted to any movable terrestrial variable-track machinery equipment known in the prior art;

at least one of said ramps extends substantially from a central portion of the crossmember support toward an end portion of said support;

the ramp is tilted with respect to an axis of displacement of the half-crossmembers;

the glider is shaped so as to enable a rotational-translational and/or linear motion of the attachment point of the cylinder;

the half-crossmember comprises means for setting the inclination of the ramp with respect to said half-crossmember.

According to a second embodiment of the assembly according to the invention, the means shaped so as to enlarge or reduce the angle between the wheels of the same axle for a certain pivoting of said wheels and for a certain position of said half-crossmembers, in comparison with the angle obtained between said wheels, for the same pivoting of said wheels and for another position of said half-crossmembers, said enlargement or reduction being directly dependent of the distance between the wheels, comprise at least one electro-hydraulic device.

According to this second embodiment, the device for piloting the steering of the wheels comprises steering cylinders interposed between the chassis and the wheels supports, and the electro-hydraulic device comprises:

means for acquiring the position of the wheels and the track width of the machinery equipment;

at least one supervisor comprising at least one calculator connected to said acquisition means;

at least one box for regulating the hydraulic pressure introduced into the steering cylinders.

Optionally, the means for acquiring the position of the wheels and the track width of the machinery equipment comprise:

at least one steering sensor adapted for determining the pivot angle of at least one wheel;

at least one track sensor adapted for determining the track width of the machinery equipment.

Furthermore, the box for regulating the hydraulic pressure introduced into the steering cylinders defines a closed-loop circuit with one of said steering cylinders.

Moreover, the regulation box is connected to a steering control device of the machinery equipment and is adapted for piloting the extension of said cylinders.

Finally, the regulation box comprises at least one electrical control valve adapted for enabling the introduction of a fluid so as to increase or decrease the extension of the steering cylinders.

According to a variant of the second embodiment of the assembly according to the invention, the means shaped so as to enlarge or reduce the angle between the wheels of the same axle for a certain pivoting of said wheels and for a certain position of said half-crossmembers, in comparison with the angle obtained between said wheels, for the same pivoting of said wheels and for another position of said half-crossmembers, said enlargement or reduction being directly dependent of the distance between the wheels, comprise at least one electro-electric device.

The present invention also relates to a self-propelled or trailed movable terrestrial variable-track machinery equipment such as a sprayer-type agricultural machinery equipment or a straddle machinery equipment or a construction machinery equipment with at least two steerable wheels, remarkable in that it comprises at least one assembly according to the invention.

BRIEF DESCRIPTION OF THE DRAWINGS

Other features, objects and advantages of the present invention, will appear upon reading the detailed description that follows, according to the embodiments given as non-limiting examples, and with reference to the appended drawings in which:

FIG. 1 schematically represents a variable-track machinery equipment in the retracted position in a rectilinear displacement;

FIG. 2 schematically represents the same machinery equipment in a cornering situation, wherein the Ackermann steering geometry has been traced;

FIG. 3 is a representation similar to that of FIG. 1, wherein the Ackermann steering geometry has been traced;

FIG. 4 represents, in a cornering situation, the variable-track machinery equipment in the extended position, wherein the Ackermann steering geometry has been traced;

FIG. 5 represents a four-wheel-steered variable-track machinery equipment in the retracted position and in a cornering situation, wherein the Ackermann steering geometry has been traced;

FIG. 6 is a representation similar to that of FIG. 5, the machinery equipment being configured in the extended position;

DETAILED DESCRIPTION

In all figures, identical or similar references refer to identical or similar members or sets of members.

Figure 1:
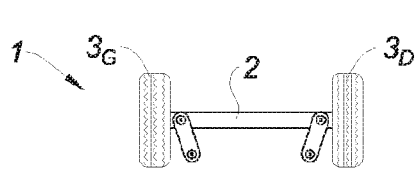
FIGS. 1 to 6 relate to a variable-track machinery equipment according to the prior art.
Figure 2:
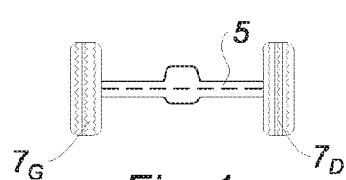
Figure 3:
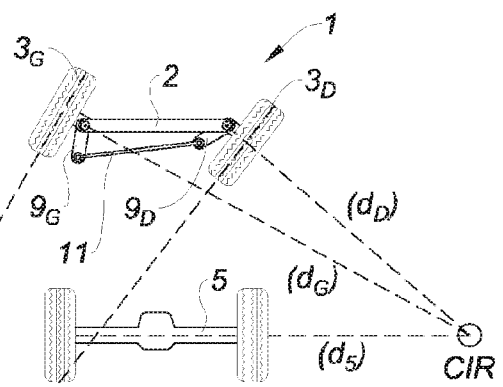
Figure 3:
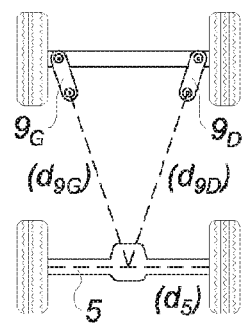
Figure 4:
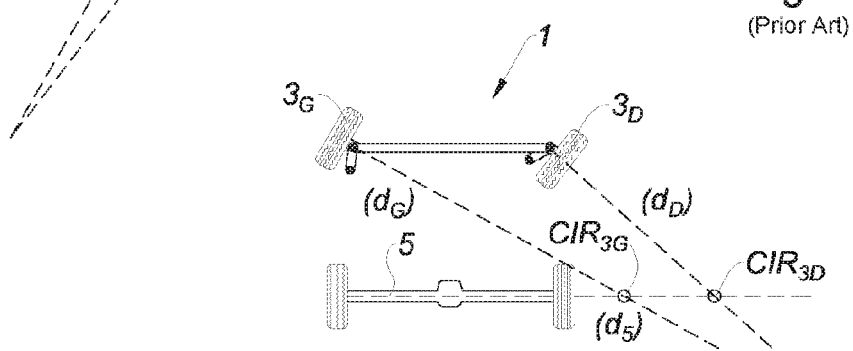
Figure 5:
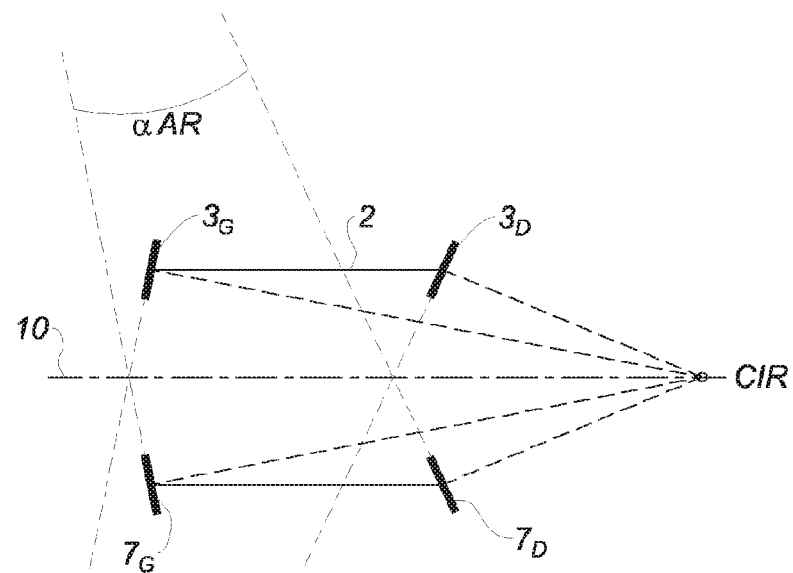
Figure 6:
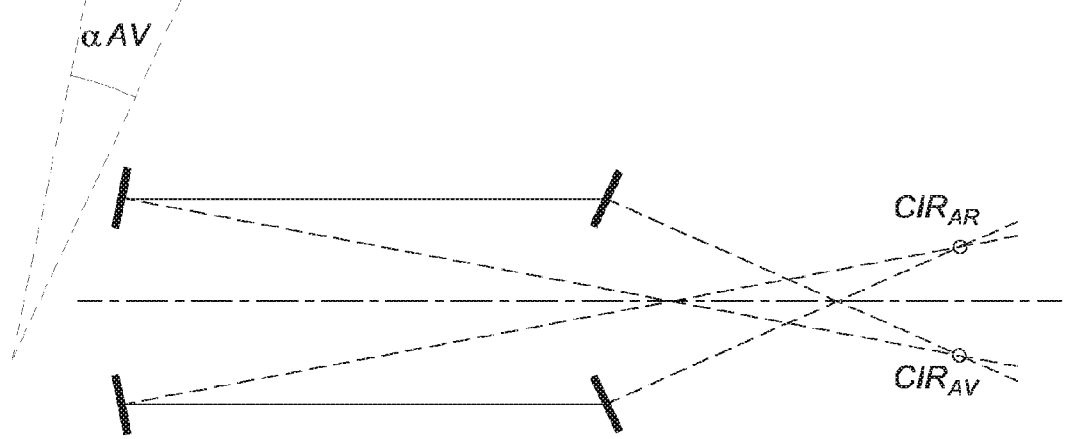
Figure 7:
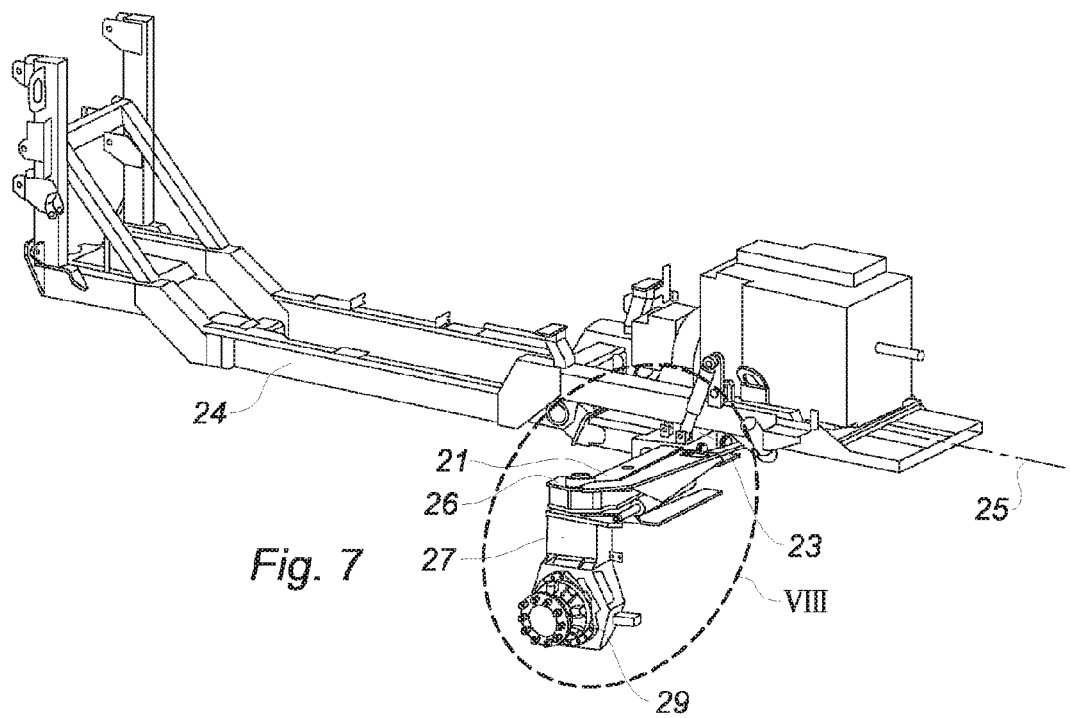
FIG. 7 illustrates a simplified view of a chassis for a variable-track machinery equipment equipped with an assembly according to a first embodiment of the invention.

Referring to FIG. 7, illustrating a half-crossmember 21 according to the invention, telescopically mounted on a crossmember support 23 secured to a chassis 24.

The cross-member support 23 is mounted on the chassis 24 while keeping its suspension degrees of freedom, the chassis 24 may be a movable terrestrial machinery equipment (not represented) such as, for example, a sprayer-type agricultural machinery equipment, a straddle machinery equipment, a construction machinery equipment or any other type.

Two half-crossmembers (only the half-crossmember intended to support the right front wheel is represented in a simplified manner) are mounted on the crossmember support 23, symmetrically positioned with respect to the longitudinal axis 25 of the chassis.

The end portion 26 of each half-crossmember 21 receives a wheel support 27 intended to support a wheel (not represented) rotatably mounted on the shaft 29.

Figure 8:
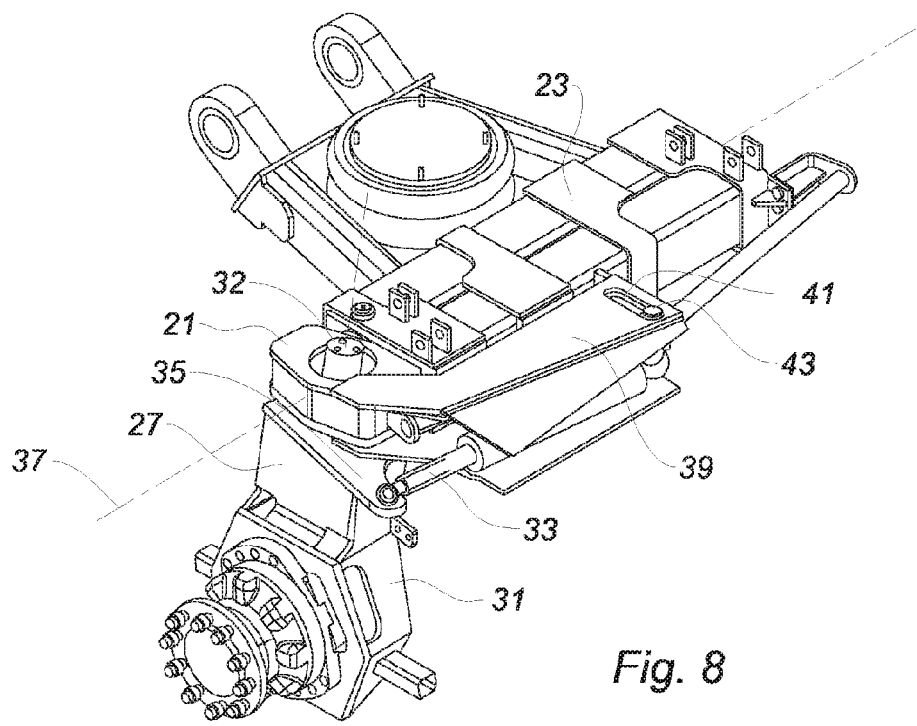
FIG. 8 is an enlarged simplified view of the area VIII of FIG. 7.

Referring to FIG. 8, illustrating, in a simplified manner for more clarity, the half-crossmember 21 in a retracted position, mounted on the crossmember support 23.

The wheel support 27 comprises a steering knuckle assembly 31 pivotally mounted about a substantially vertical pivot axis 32. Pivoting of the steering knuckle assembly 31 is achieved via a steering cylinder 33, the rod end of which is connected to a steering tie rod 35 secured to said steering knuckle assembly.

The steering cylinders constitute a device for piloting the steering of the wheels. Of course, such a device may be constituted by any other means known by those skilled in the art.

The steering cylinders 33 are typically constituted by double-acting cylinders, connected to a conventional steering control device (not represented) comprising a hydraulic pump activated by the rotation of the steering wheel from the driver's cab and delivering a fluid at either side of the piston of the cylinder, depending on the direction of rotation of the steering wheel.

Each half-crossmember 21 is further movable in translation relative to the crossmember support along an axis of displacement 37. The displacement of each half-crossmember allows switching the machinery equipment alternately between a «retracted» position and an «extended» position.

When the machinery equipment is in the retracted position, the track width is, for example, equal to about 1.8 meters, and the machinery equipment is particularly adapted for rolling on all tracks of the roadway.

When in an extended position, the machinery equipment presents, for example, a track width equal to about 3.2 meters, thereby enhancing the stability of the machinery equipment on irregular surfaces such as, for example, those of fields to be sprayed on.

Switching between these positions is achieved in a known manner via cylinders comprising an attachment point secured to the crossmember support and the end of each rod of which is connected to each half-crossmember. By activating the cylinders, the half-crossmembers switch from their retracted position into their extended position. This arrangement is well known by those skilled in the art and hence, it will not be described further in the following description.

According to the invention, a submount 39 is fastened on each one of the half-crossmembers 21, on which is inscribed a slot, equivalent to a glider 41, with a substantially circular profile and the dimensions of which are shaped so as to receive an attachment point 43 of the steering cylinder 33.

Figure 9:
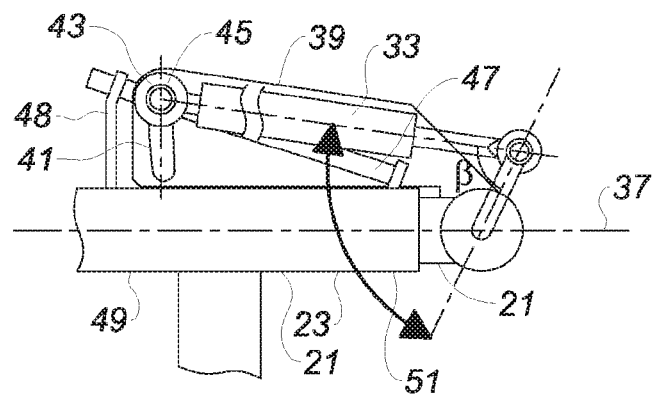
FIG. 9 schematically represents a top view of a half-crossmember in the retracted position mounted on the crossmember support, for a two-wheel-steered vehicle.

Referring now to FIG. 9, schematically representing a top view of the crossmember support 23 and the half-crossmember 21 in the retracted position, which position corresponds to the position that has just been illustrated.

In such a position, the attachment point 43 of the cylinder 33 is in abutment against the front end 45 of the glider 41.

The crossmember support 23 receives a ramp 47 connected to said support by a holding device 48. The ramp 47 extends substantially from a central portion 49 of said support located substantially at the level of the longitudinal axis of the chassis (to the left of the crossmember support 23 in FIG. 9) toward an end portion 51 of said support (to the right of the crossmember support). Furthermore, the ramp 47 is tilted with respect to the axis of displacement 37 of the half-crossmembers, and is shaped so as to enable sliding of the attachment point of the cylinder along said ramp.

Figure 10:
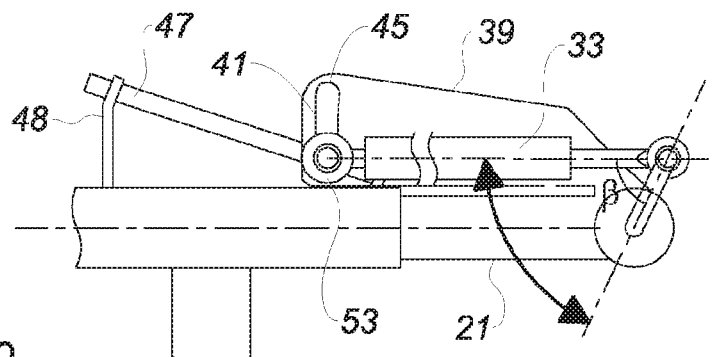
FIG. 10 is a view similar to that of FIG. 9, the half-crossmember being represented in the extended position.
Figure 11:
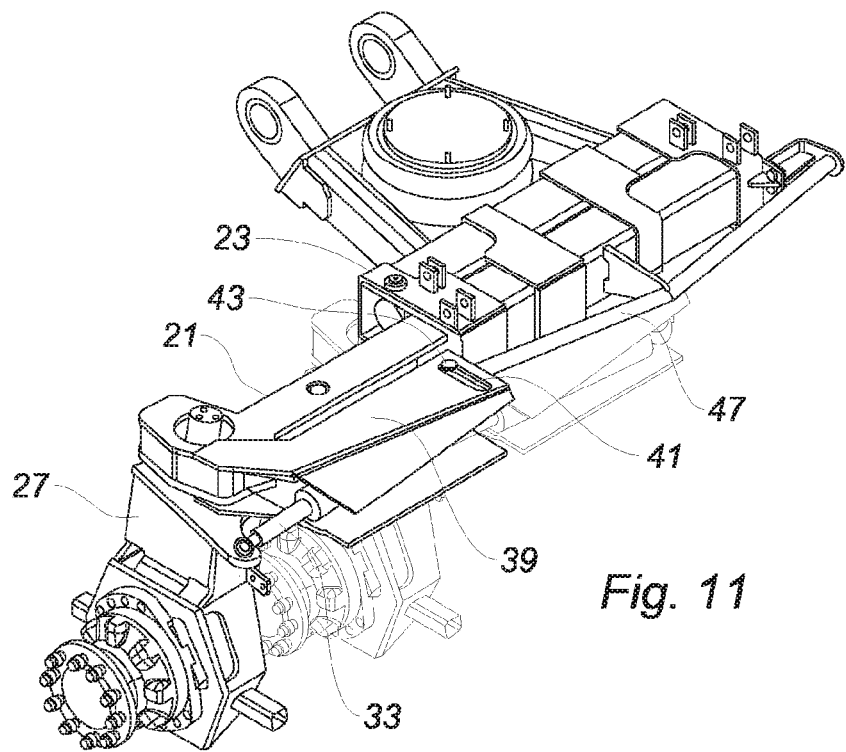
FIG. 11 is a simplified view similar to that of FIG. 8, the half-crossmember being represented in the extended position.

The arrangement of the glider 41, the ramp 47 and the steering cylinder 33 is such that during a displacement from a retracted position to an extended position represented in FIGS. 10 and 11, the ramp 47 constrains the attachment point 43 of the cylinder to be displaced along the glider 41, from the front end 45 of said glider back to the rear end 53 of the glider.

To this end, the submount 39 and the ramp 47 constitute means for displacing the attachment point of each steering cylinder during an extension of the half-crossmembers relative to the chassis.

In such an extended position, the angle β formed between the cylinder 33 and the steering tie rod 35 is reduced in comparison with the angle β obtained in the previously described retracted position, represented in FIG. 9.

By reducing the angle between the cylinder and the steering tie rod when the track width is enlarged, that is to say by bringing the attachment point 43 of the cylinder close to the half-crossmember 21, without modifying the inclination of said steering tie rod in a rectilinear operation situation, the same cylinder stroke results in a more significant inclination of said steering tie rod, in comparison with the inclination of the steering tie rod obtained for the same cylinder stroke in a retracted position.

In other words, when the wheels pivot in a cornering situation, and with the half-crossmembers 21 in an extended position, the opening angle α between the steered wheels (visible in FIG. 12), which corresponds to the angle formed by the steered wheels in a cornering situation, is substantially enlarged in comparison with the relative opening of said wheels obtained when the wheels pivot, with the half-crossmembers in the retracted position.

Figure 12:
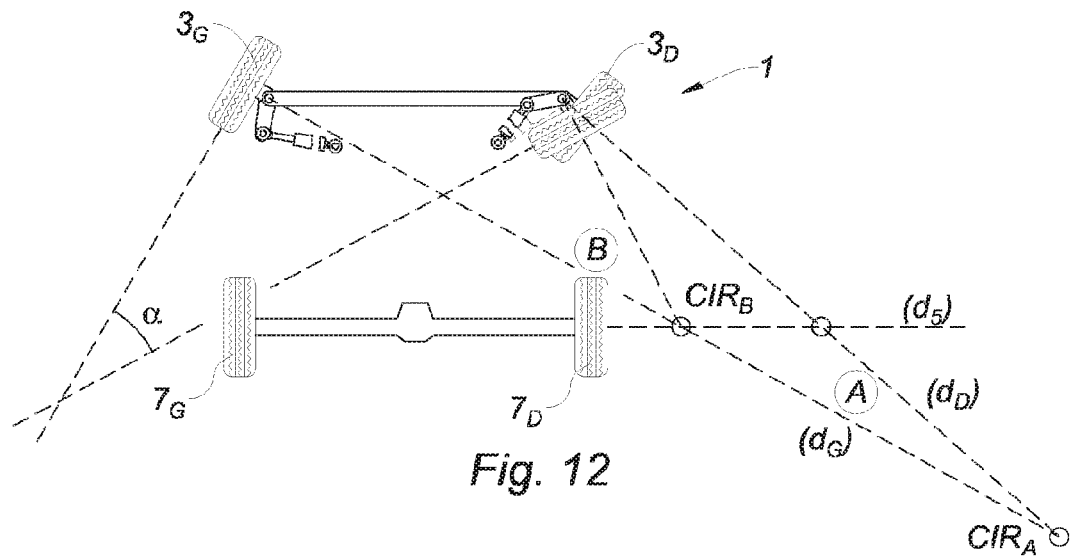
FIG. 12 schematically represents, in a cornering situation, the two-wheel-steered variable-track machinery equipment in the extended position, equipped with an assembly according to the first embodiment of the invention, wherein the steering angle correction is represented.

The fact that a larger angular opening between the wheels is allowed when the track width is enlarged results in a displacement of the Ackermann point substantially along the axis passing through the shafts of the rear wheels, as illustrated in FIG. 12, schematically representing a machinery equipment 1 in the extended position, for example for a 3-meter track width.

In this Figure have been traced the Ackermann steering geometry A, obtained without any device for correcting the attachment point of the cylinder based on the track width, and the Ackermann steering geometry B that is obtained with the means according to the invention intended to displace the attachment point of the cylinders, when the steered wheels of the machinery equipment pivot to the right.

Referring to the steering geometry A, the instantaneous center of rotation $ICR_A$, at the intersection of the line $(d_D)$ perpendicular to the right front wheel $3_D$ and passing through its center, with the line $(d_G)$ perpendicular to the left front wheel $3_G$ and passing through its center, is located to the rear of the axis $(d_5)$ passing through the center of the rear wheels $7_G$, $7_D$.

According to the steering geometry B, obtained thanks to the assembly according to the invention, the right front wheel has pivoted through a larger angle in comparison with the right front wheel of the steering geometry A, and this for the same cylinder stroke. By enlarging the relative opening of the steered wheels when the track width is enlarged, the instantaneous center of rotation $ICR_B$ is aligned on the axis $(d_5)$, thereby allowing approaching the non-slip conditions and significantly limiting the shifting phenomenon.

Figure 13:
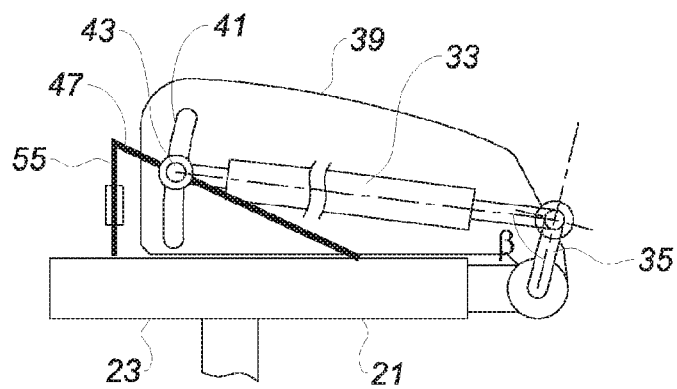
FIG. 13 schematically represents a top view of a half-crossmember in the retracted position mounted on the crossmember support, for a four-wheel-steered vehicle.

Referring now to FIG. 13, schematically illustrating an embodiment of the means for displacing the attachment point of the cylinder when the vehicle is equipped with means for switching alternately from a two-wheel-drive configuration into a four-wheel drive configuration.

FIG. 13 schematically represents a top view of the half-crossmember 21 in the retracted position.

The holding device 48 (visible in FIGS. 9 and 10) between the crossmember support 23 and the ramp 47 has been replaced with a cylinder 55, thereby allowing modifying the inclination of said ramp when switching from a two-wheel-steered configuration into a four-wheel-steered configuration, which is conventionally carried out from the driver's cab.

When switching into a four-wheel-steered configuration, the angle between the ramp 47 and the crossmember support 23 has been reduced in comparison with the angle formed for a «two-wheel-steered» configuration, which results in a displacement of the attachment point 43 of the cylinder 33 in the glider 41 supported by the submount 39.

The glider 41 is shaped, on the one hand, so as to displace the attachment point 43 of the cylinder 33 to the left of the half-crossmember 21, when switching from a two-wheel-steered configuration into a four-wheel-steered configuration, and on the other hand, so as to enable a rotational-translational motion of the attachment point 43 of the cylinder 33, when switching from a retracted position into an extended position of the machinery equipment.

By providing for a displacement of the attachment point of the cylinder to the left of the half-crossmember, when switching from a two-wheel-steered configuration into a four-wheel-steered configuration, the angle β between the steering tie rod 35 and the cylinder 33 is reduced, for the same cylinder stroke, in comparison with the angle obtained with a two-wheel-steered vehicle.

Thus, for a four-wheel-steered vehicle, the magnitude of pivoting of the steering tie rod 35 is increased for a cylinder stroke 33 identical to that obtained with a two-wheel-steered vehicle.

Of course, the cylinder 33 may be replaced with any means allowing setting the inclination of the ramp with respect to the half-crossmember and known by those skilled in the art, such as for example a linkage system.

Figure 14:
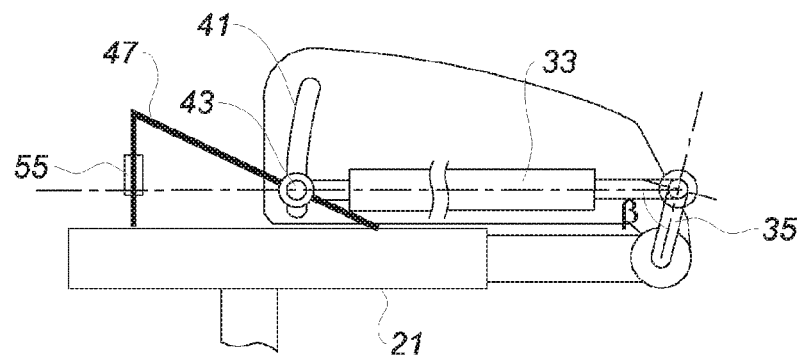
FIG. 14 is a view similar to that of FIG. 13, the half-crossmember being represented in the extended position.

As before, and as illustrated in FIG. 14 schematically representing a top view of the half-crossmember 21 in the extended position, the angle β formed between the cylinder 33 and the steering tie rod 35 is reduced in comparison with the angle β obtained in the previously described retracted position, represented in FIG. 13. By reducing this angle in this manner, the attachment point 43 of the cylinder 33 is brought close to the half-crossmember 21 without modifying the inclination of the steering tie rod 35 in a rectilinear operation situation. Thus, the same cylinder stroke results in a more significant inclination of the steering tie rod 35 when the machinery equipment is in the extended position, in comparison with the inclination obtained for the same cylinder stroke in the retracted position.

In other words, when the wheels pivot in a cornering situation, and with the half-crossmembers 21 in an extended position, the opening angle between the steered wheels is substantially enlarged in comparison with the relative opening of said wheels obtained when the wheels pivot, with the half-crossmembers in the retracted position.

Figure 15:
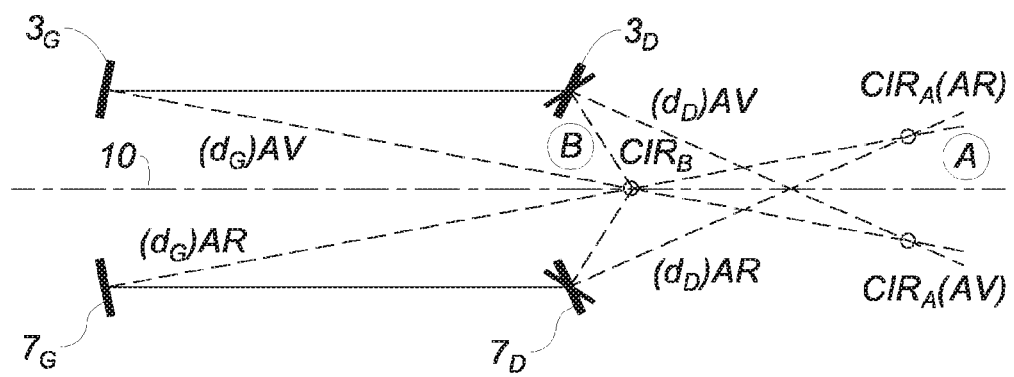
FIG. 15 is a view similar to that of FIG. 12, the represented machinery equipment being a four-wheel-steered vehicle.

Referring now to FIG. 15 illustrating, as in FIG. 12, the Ackermann steering geometry A obtained without any device for correcting the attachment point of the cylinder based on the track width, and the Ackermann steering geometry B obtained with the means according to the invention intended to displace the attachment point of the cylinders, during a right turn, for a four-wheel-steered vehicle.

Referring to the steering geometry A, the instantaneous center of rotation $ICR_A(AV)$, at the intersection of the line $(d_D)_{AV}$ perpendicular to the right front wheel $3_D$ and passing through its center, with the line $(d_G)_{AV}$ perpendicular to the left front wheel $3_G$ and passing through its center, is located to the rear of the transverse middle axis 10 of the machinery equipment, whereas the instantaneous center of rotation $ICR_A(AR)$, at the intersection of the line $(d_D)_{AR}$ perpendicular to the right rear wheel $7_D$ and passing through its center, with the line $(d_G)_{AR}$ perpendicular to the left rear wheel $7_G$ and passing through its center, is located to the front of the transverse middle axis 10 of the machinery equipment.

According to the steering geometry B, obtained thanks to the assembly according to the invention, the right front wheel $3_D$ has pivoted through a larger angle in comparison with the right front wheel of the steering geometry A, and this for the same cylinder stroke. Similarly, the right rear wheel $7_D$ has also pivoted through a larger angle in comparison with the right rear wheel of the steering geometry A.

By enlarging the relative opening of the steered wheels, corresponding to an enlargement of the angles $\alpha_{AV}$ and $\alpha_{AR}$ when the track width is enlarged, the instantaneous center of rotation $ICR_B$ of the four steered wheels is substantially aligned on the transverse middle axis 10, thereby allowing approaching the non-slip conditions and significantly limiting the shifting phenomenon.

Figure 16:
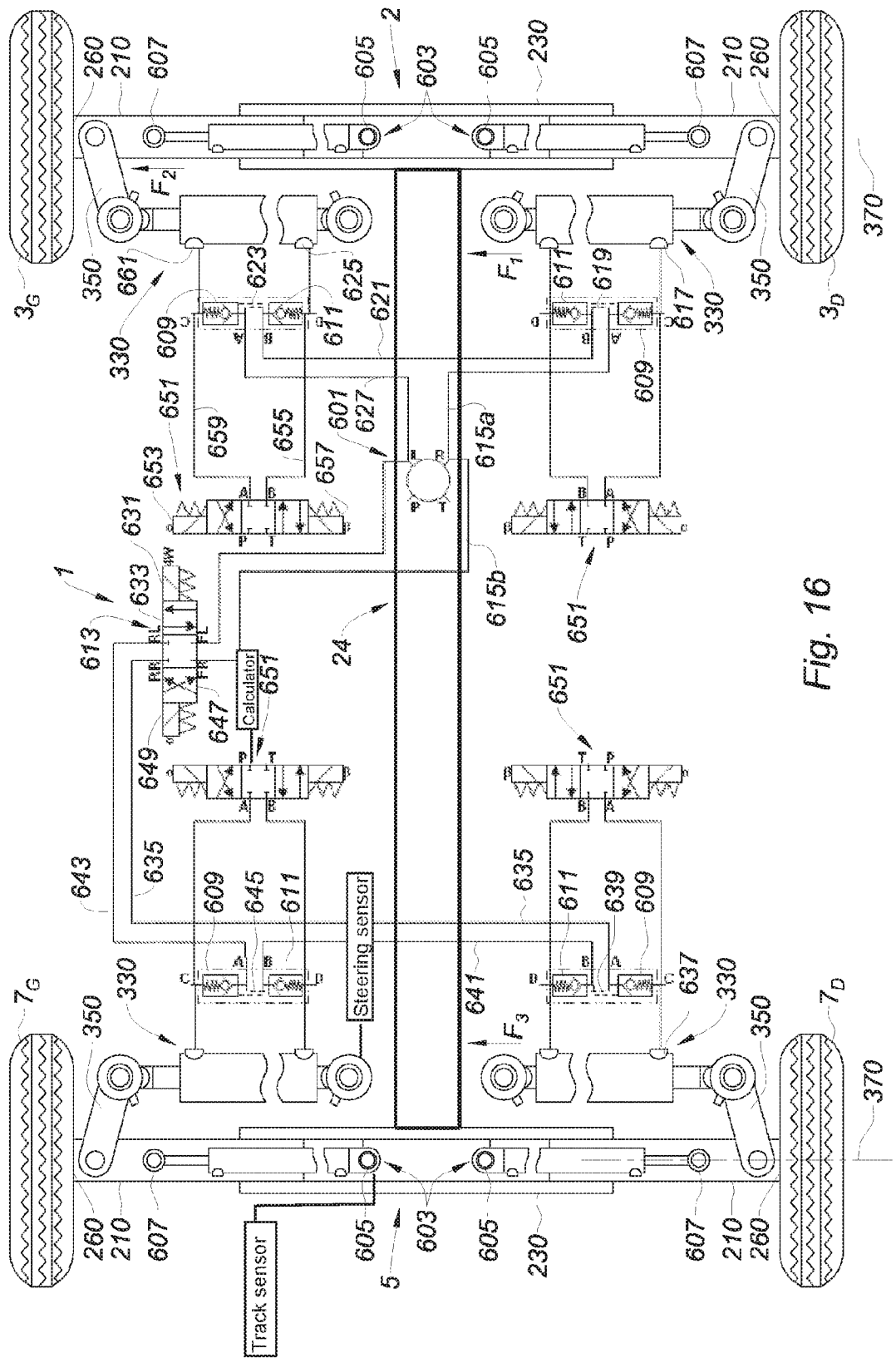
FIG. 16 schematically represents a four-wheel-steered vehicle equipped with an assembly according to a second embodiment of the invention.

Referring now to FIG. 16, schematically illustrating a four-wheel-steered machinery equipment equipped with an assembly according to a second embodiment of the invention.

As before, the machinery equipment 1 comprises a front axle 2 at the ends of which are mounted two steered front wheels $3_G$, $3_D$ and a rear axle 5 at the ends of which are mounted two rear wheels $7_G$, $7_D$ which may be steerable or not.

Of course, the front wheels may also be non-steerable and, in this case, only the rear wheels are steerable.

The machinery equipment 1 comprises four half-crossmembers 210 telescopically mounted on crossmember supports 230 secured to the chassis 24 and positioned at the front axle 2 and at the rear axle 5.

As before, the end portion 260 of each half-crossmember 210 receives a wheel support (not represented) comprising a steering knuckle assembly pivotally mounted about a substantially vertical pivot axis, pivoting of the steering knuckle assembly being achieved via steering cylinders 330, the rod end of which is connected to a steering tie rod 350 secured to the steering knuckle assembly.

The steering cylinders 330, typically constituted by double-acting cylinders, are connected to a conventional steering control device 601 of the «Orbitrol» type, comprising a hydraulic pump P activated by the rotation of the steering wheel from the driver's cab and delivering a fluid at either side of the piston of the cylinder, depending on the direction of rotation of the steering wheel, and a tank T for fluid recovery.

Each half-crossmember 210 is further movable in translation relative to the crossmember support along an axis of displacement 370. The displacement of each half-crossmember allows making the machinery equipment switch alternately between a «retracted» position and an «extended» position.

Switching between these positions is achieved in a known manner via track cylinders 603 comprising an attachment point 605 secured to the crossmember support 230 and the end 607 of each rod of which is connected to each half-crossmember 210. In a known manner, by activating the cylinders, the half-crossmembers switch from their retracted position into their extended position.

The steering control device 601 controls the rotation of the steered wheels by introducing a pressurized fluid into the steering cylinders 330. For this purpose, each steering cylinder is connected to two check valves 609, 611.

The front wheels $3_D$ and $3_G$ are steerable and the rear wheels $7_D$ and $7_G$ are made steerable or non-steerable via a set of slide valves 613.

As example, in order to perform a right turn, the steering control device 601 sends a pressurized fluid in a conduit 615a and in a conduit 615b. The fluid passes through the check valve 609 and then penetrates into the orifice 617 of the steering cylinder 330 connected to the right front wheel, which results in a displacement of the rod of the cylinder in the direction of the arrow F1, and concurrently resulting in a clockwise pivoting of the steering tie rod 350 and the rotation of the right front wheel $3_D$ to the right.

Indeed, when the fluid reaches the check valve 609, a volume of this pressurized fluid passes through the bridge 619, thereby unlocking the check valve 611 and allowing the fluid coming out of the cylinder 330 to flow in a conduit 621 until reaching the check valve 611 connected to the steering cylinder 330 of the left front wheel. A certain volume of the pressurized fluid penetrates in the check valve 611 and a certain volume of fluid passes through the bridge 623.

The volume of fluid that penetrates in the check valve 611 enters into the orifice 625 of the steering cylinder 330 connected to the left front wheel $3_G$, resulting in the displacement of the rod of the cylinder in the direction as represented by the arrow F2. Such a displacement of the cylinder rod results in a pivoting of the corresponding steering tie rod 350, and concurrently the rotation of the left front wheel $3_G$ to the right.

The volume of fluid that has passed through the bridge 623 unlocks the check valve 609 thereby allowing the fluid coming out of the left cylinder 330 to flow toward the tank T of the steering control device 601, via the conduit 627, so that the hydraulic circuit is a closed-loop circuit.

The conduit 615 is, in turn, connected to the slide valves 613. The valves 613 are electronically (or electrically) controlled so as to allow for three steering modes of the machinery equipment: two steered front wheels, four steered wheels in a «crab» fashion (in a cornering situation, the wheels are along the same direction), four steered wheels in a «coordinated» fashion (in a cornering situation, the two steered rear wheels turn in the reverse direction as the steered front wheels).

For a displacement of the machinery equipment in the four-wheel-steered mode in a coordinated fashion, a signal is sent from the driver's cab to an electrical control valve 631 thereby activating the valve 633. The fluid that is displacing in the conduit 615b as the command for displacing the machinery equipment to the right is sent then passes through the valve 633 and circulates in a conduit 635 feeding the steering cylinder 330 of the right rear wheel $7_D$ via a check valve 609.

The fluid penetrates into the orifice 637 of the cylinder 330, thereby displacing the rod of the cylinder in the direction of the arrow F3, which results in a counterclockwise pivoting of the steering tie rod 350 of the right rear wheel $7_D$, and the rotation of said wheel to the left.

The left rear wheel $7_G$ is also turned to the left thanks to the action of the pressurized fluid which passes through the bridge 639 thereby unlocking the check valve 611 and allowing the fluid coming out of the cylinder 330 to flow in the conduit 641 feeding the steering cylinder 330 of the left rear wheel, via the check valve 611.

A portion of the volume of fluid arriving via the conduit 641 is actually sent in the check valve 611. By passing through the bridge 645, the other portion of the volume of fluid unlocks the check valve 609 thereby allowing the fluid coming out of the cylinder 330 to return in the tank T of the steering control device 601.

The preceding description relates to the coordinated operation of the machinery equipment in the four-wheel-steered mode, that is to say that the front wheels and the rear wheels turn in opposite directions when the machinery equipment is turning.

In order to enable a displacement of the machinery equipment in the four-wheel drive mode in a «crab» fashion, an electric signal is sent to the electrical control device 649 in order to activate the valve 647, thereby enabling a displacement of the fluid from the conduit 615b toward the conduit 643 and the introduction of the fluid into the corresponding orifice of the steering cylinder 330, which results in a rotation of the left rear wheel to the right during a right turn.

Switching from a «four-wheel-steered» mode into the «two-wheel-steered» mode is achieved by restoring the valves 633 and 647 into their original position. In such a configuration, the fluid sent by the steering control device 601 in the right or left conduit is blocked at the slide valves 613 and does not reach the rear wheels.

According to the invention, for a certain position of the two half-crossmembers, the assembly comprises means shaped so as to enlarge or reduce the relative opening of the wheels as they pivot, in comparison with the relative opening of the wheels obtained for the same pivoting and with another position of the two half-crossmembers.

According to this second embodiment of the invention, these means comprise an electro-hydraulic device.

These means comprise electronic means which control a «BTAP» box 651 for regulating the hydraulic pressure introduced into the steering cylinders.

Each steering cylinder is connected to the regulation box 651, which is, in turn, connected to the pump P and to the tank T of the steering control device 601.

The regulation box 651 is controlled by a digital supervisor (not represented) further comprising at least one calculator.

The entire device is equipped with means for acquiring the position of the wheels and the track width of the machinery equipment.

By «means for acquiring the position of the wheels», it is referred to any device adapted for determining the pivot angle of a wheel of the machinery equipment at a given time. To this end, such a device may be adapted for collecting the position of the wheel, that is to say its pivot angle with respect to a reference position, or collecting the value of the stroke of a steering cylinder secured to the steering tie rod of a wheel, in order to deduce the pivot angle of the wheel therefrom.

By «means for acquiring the track width», it is referred to any device adapted for collecting the track width that the machinery equipment presents at a given time.

More specifically and as example, the track cylinder 603 is connected to a track sensor adapted for assessing the track width of the machinery equipment, whereas the steering cylinder 330 is connected to a steering sensor adapted for collecting the position of the wheel. The position sensor collects either the angle of rotation of the wheel or the distance covered by the rod of the steering cylinder 330.

The digital supervisor defines the necessary angular correction to be brought to one or more of the steered wheels in order to approach the Ackermann steering geometry.

Afterwards, the digital calculator of the supervisor sends a command to the regulation box 651 so as to control the introduction of a fluid into either one of the two orifices of the steering cylinder 330 in order to enlarge or reduce the stroke of the rod of the cylinder and consequently act on the angle of rotation of a wheel.

For this purpose, for a given track width and for a given angle of the so-called «master» wheel, the so-called «piloted» wheel must present a certain angle of rotation in order to comply with the Ackermann steering geometry.

In the case of a right turn with the machinery equipment in the four-wheel-steered position and operating in a «coordinated» fashion, the fluid is sent in the steering cylinders 330 which activate the right front wheel $3_D$ and the right rear wheel $7_D$ as previously explained in the description.

The digital calculator of the supervisor receives the information from the track and steering sensors. The calculator compares the values of the angle of each «master» wheel (for example, the right front wheel and the right rear wheel, respectively) and the angle of each «piloted» wheel (for example, the left front wheel and the left rear wheel, respectively) to the theoretical values of the angle expected for the left front wheel and left rear wheel, for a given track width.

For this purpose, the calculator is provided with abacuses informing on the angle of rotation that the piloted wheel has to present in order to approach as close as possible the Ackermann steering geometry, for a given track width and for a given angle of the master wheel.

In the case where an enlargement of the angle of the left front wheel (the piloted wheel) is, for example, necessary in order to approach the Ackermann steering geometry, which case is considered when switching from an extended position of the two half-crossmembers into a retracted position of the two half-crossmembers, the supervisor controls the regulation box 651 connected to the left front wheel $3_G$. An electric signal is then sent to the electrical control valve 653 which results in an introduction of the fluid into the pathway B through the conduit 655 connected to the orifice 625 of the steering cylinder 330 of the left front wheel, thereby enabling an extension of the stroke of the cylinder, and thus an enlargement of the angle of rotation of the wheel in comparison with the angle initially obtained for a larger track width.

In the case where a reduction of the angle of the left front wheel is necessary in order to approach the Ackermann steering geometry, which case is considered when switching from a retracted position of the two half-crossmembers into an extended position of the two half-crossmembers, the supervisor controls the regulation box 651 connected to the left front wheel $3_G$ and an electric signal is sent to the electrical control valve 657 which results in an introduction of the fluid into the pathway A through the conduit 659 connected to the orifice 661 of the steering cylinder 330 of the left front wheel, thereby enabling a reduction of the stroke of the cylinder, and thus a reduction of the angle of rotation of the wheel in comparison with the angle initially obtained for a smaller track width.

The regulation box 651 forms with the steering cylinder 330 a closed-loop circuit, that is to say that a first orifice of the cylinder receives the pressurized fluid thanks to the pump P of the steering control device 601 to which the regulation box is connected, and a second orifice of the steering cylinder is connected to said regulation box which is also connected to the tank T of the steering control device, in order to evacuate the fluid introduced into the cylinder.

Figure 17:
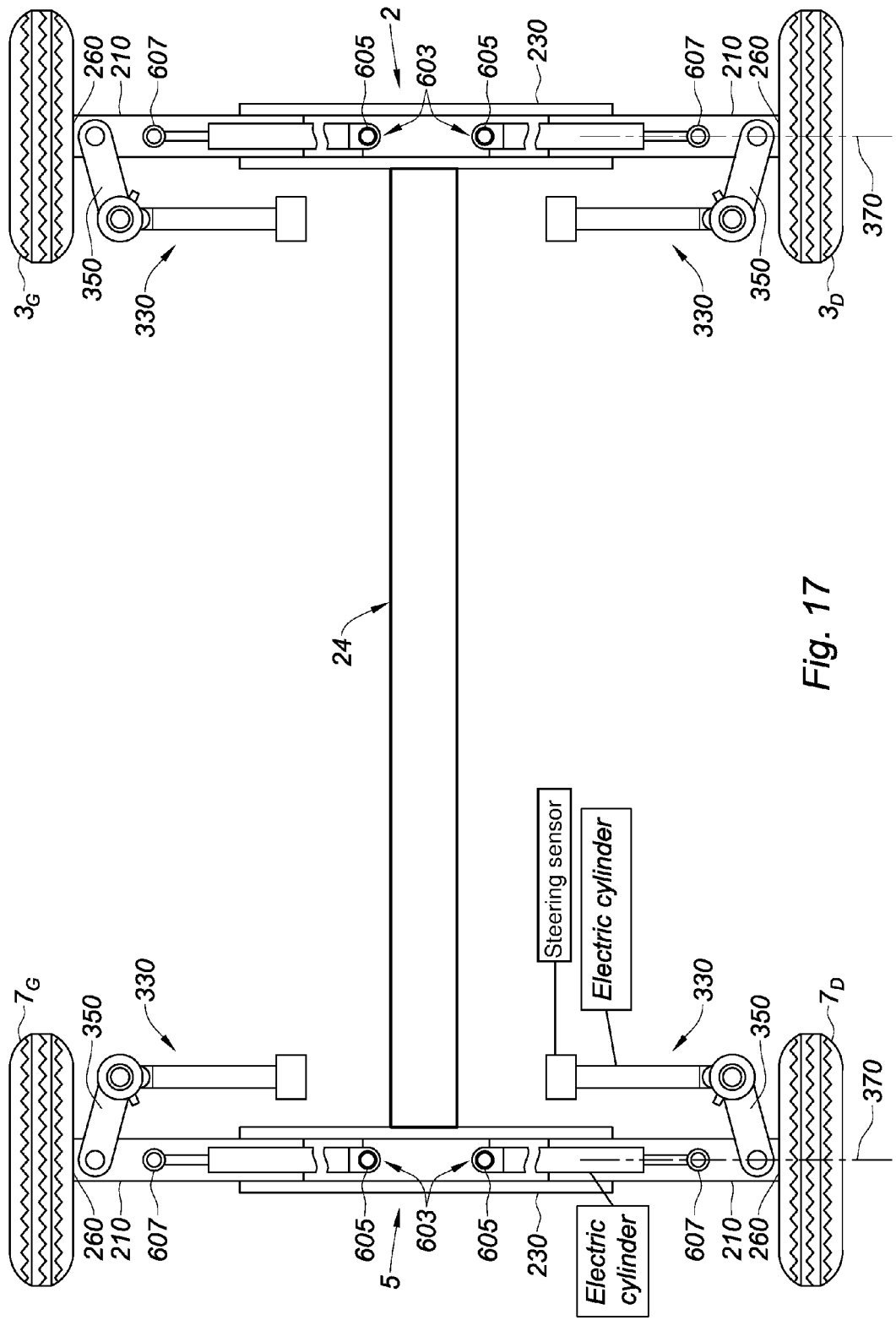
FIG. 17 represents a four-wheel-steered vehicle equipped with an assembly according to a third embodiment of the invention.

The preceding description refers to an electro-hydraulic device. Of course, this device may be replaced with an electro-pneumatic device, or still with an electro-electric device. As example, in the case of an electro-electric device, the steering and/or track cylinders, to which the present description refers, consist of electric cylinders, as illustrated in FIG. 17.

Thanks to the present invention, we remain close to the Ackermann steering geometry regardless of the retained track width. Furthermore, compliance with the Ackermann steering geometry is achieved thanks to a device which is easy to mount on any type of movable terrestrial variable-track machinery equipment whether with two or with four steerable wheels.

According to the first embodiment of the assembly according to the invention, the displacement of the half-crossmembers alternately between a retracted position and an extended position results, mechanically, simultaneously and instantaneously, in the displacement of the attachment point of the cylinders, thereby suppressing the prior step of setting up the inclination of the steering tie rods.

According to the second embodiment, we approach the Ackermann steering geometry regardless of the track width applied to the machinery equipment, thanks to an electronically-piloted hydraulic device. Alternatively, this device may be pneumatic or electric.

It goes without saying that the invention is not limited to the sole embodiments of this assembly, described above only but as illustrative examples, but it encompasses, on the contrary, all variants thereof. To this end, for example, the assembly previously described with reference to the first embodiment of the invention may be advantageously coupled with an electronic control device, thereby allowing increasing the accuracy of the positioning of the attachment point of the cylinder in the glider.

The invention claimed is:

1. An assembly comprising:
   a chassis for a movable terrestrial machinery equipment;
   at least two half-crossmembers telescopically mounted on the chassis between a retracted position and an extended position;
   wheels supports pivotally mounted on each one of said half-crossmembers;
   steerable wheels rotatably mounted on said supports and connected to each other by an axle;
   a device for piloting the steering of the wheels; and
   a mechanical or electro-hydraulic or electro-electric component configured to enlarge or reduce the angle between the wheels of the same axle for a certain pivoting of said wheels and for a certain position of said half-crossmembers, in comparison with the angle obtained between said wheels, for the same pivoting of said wheels and for another position of said half-crossmembers, said enlargement or reduction of the angle being directly dependent of the distance between the wheels.

2. The assembly according to claim 1, wherein the device for piloting the steering of the wheels comprises steering cylinders interposed between the chassis and the wheels supports, wherein said component shaped so as to enlarge or reduce the angle between the wheels of the same axle for a certain pivoting of said wheels and for a certain position of said half-crossmembers, in comparison with the angle obtained between said wheels, for the same pivoting of said wheels, and for another position of said half-crossmembers, said enlargement or reduction of the angle being directly dependent of the distance between the wheels, comprise a mechanical component for displacing an attachment point of each steering cylinder during an extension of the half-crossmembers relative to the chassis.

3. The assembly according to claim 2, wherein the attachment point of each cylinder cooperates with at least one ramp/glider system shaped so as to constrain the attachment point of each cylinder to be displaced in a glider.

4. The assembly according to claim 3, wherein the means for displacing the attachment point of each cylinder comprise, at least one submount mounted on a half-crossmember and comprising said glider shaped so as to cooperate with the attachment point of each cylinder, or, the at least one ramp mounted on a crossmember support secured to the chassis, said ramp being shaped so as to constrain the displacement of the attachment point of the cylinder in said glider during a displacement of said half-crossmembers.

5. The assembly according to claim 4, wherein at least one of said ramps extends substantially from a central portion of the crossmember support toward an end portion of said support.

6. The assembly according to claim 4, wherein the at least one ramp is tilted with respect to an axis of displacement of the half-crossmembers.

7. The assembly according to claim 4, wherein the glider is shaped so as to enable a rotational-translational and/or linear motion of the attachment point of the cylinder.

8. The assembly according to claim 3, wherein the half-crossmember comprises a setting component configured for setting the inclination of the at least one ramp with respect to said half-crossmember.

9. The assembly according to claim 1, wherein the component configured to enlarge or reduce the angle between the wheels of the same axle for a certain pivoting of said wheels and for a certain position of said half-crossmembers, in comparison with the angle obtained between said wheels, for the same pivoting of said wheels and for another position of said half-crossmembers, said enlargement or reduction of the angle being directly dependent of the distance between the wheels, comprise at least one electro-hydraulic device.

10. The assembly according to claim 9, wherein the device for piloting the steering of the wheels comprises steering cylinders interposed between the chassis and the wheels supports, characterized in that the electro-hydraulic device comprises:
    an acquiring component configured for acquiring the position of the wheels and the track width of the machinery equipment;
    at least one supervisor comprising at least one calculator connected to said acquisition component;
    at least one box for regulating the hydraulic pressure introduced into the steering cylinders.

11. The assembly according to claim 10, wherein the acquiring component comprises:
    at least one steering sensor adapted for determining the pivot angle of at least one wheel;
    at least one track sensor adapted for determining the track width of the machinery equipment.

12. The assembly according to claim 10, wherein the box for regulating the hydraulic pressure introduced into the steering cylinders defines a closed-loop circuit with one of said steering cylinders.

13. The assembly according to claim 10, wherein the box is connected to a steering control device of the machinery equipment and is adapted for piloting the extension of said cylinders.

14. The assembly according to claim 10, wherein the box comprises at least one electrical control valve adapted for enabling the introduction of a fluid so as to increase or decrease the extension of the steering cylinders.

15. The assembly according to claim 1, wherein the component configured to enlarge or reduce the angle between the wheels of the same axle for a certain pivoting of said wheels and for a certain position of said half-crossmembers, in comparison with the angle obtained between said wheels, for the same pivoting of said wheels and for another position of said half-crossmembers, said enlargement or reduction of the angle being directly dependent of the distance between the wheels, comprise at least one electro-electric device.

16. A self-propelled or trailed movable terrestrial variable-track machinery equipment with at least two steerable wheels, comprising at least one assembly according to claim 1.

* * * * *